United States Patent
Yang et al.

(10) Patent No.: US 9,772,630 B2
(45) Date of Patent: Sep. 26, 2017

(54) AUTOMATIC WATER DISCHARGE DEVICE OF PNEUMATICALLY OPERATED APPARATUS

(71) Applicants: Chu-Ting Yang, New Taipei (TW); Shang-Ching Yang, New Taipei (TW)

(72) Inventors: Chu-Ting Yang, New Taipei (TW); Shang-Ching Yang, New Taipei (TW)

(*) Notice: Subject to any disclaimer, the term of this patent is extended or adjusted under 35 U.S.C. 154(b) by 268 days.

(21) Appl. No.: 14/684,422

(22) Filed: Apr. 12, 2015

(65) Prior Publication Data

US 2015/0300521 A1    Oct. 22, 2015

(30) Foreign Application Priority Data

Apr. 18, 2014    (TW) .............................. 103206845 U

(51) Int. Cl.
    *G05D 9/12*    (2006.01)
    *G05D 22/02*    (2006.01)

(52) U.S. Cl.
    CPC ............... *G05D 9/12* (2013.01); *G05D 22/02* (2013.01)

(58) Field of Classification Search
    CPC ... G05D 22/02; G05D 9/12; F16T 1/00; F16T 1/38; F16T 1/48; Y10S 55/17
    USPC ........................ 137/204, 203, 187, 547, 550; 251/129.21; 188/352; 96/109, 117; 250/573, 577; 73/25.04, 335.01
    See application file for complete search history.

(56) References Cited

U.S. PATENT DOCUMENTS

| | | | | |
|---|---|---|---|---|
| 2,508,132 A | * | 5/1950 | Aikman | F16T 1/24 137/195 |
| 2,869,570 A | * | 1/1959 | Wilkerson | F16T 1/14 137/204 |
| 4,205,972 A | * | 6/1980 | Visos | B01D 45/10 137/550 |
| 4,261,382 A | * | 4/1981 | Bridges | F16T 1/00 137/187 |
| 4,336,821 A | * | 6/1982 | Frantz | B61C 17/02 137/187 |
| 4,896,692 A | * | 1/1990 | Baun | F16K 31/42 137/203 |
| 4,946,107 A | * | 8/1990 | Hunt | F02M 51/0667 251/129.21 |
| 5,749,391 A | * | 5/1998 | Loutzenhiser | F15B 21/041 137/204 |
| 6,206,025 B1 | * | 3/2001 | Koch | F16T 1/00 137/187 |

(Continued)

*Primary Examiner* — Eric Keasel
(74) *Attorney, Agent, or Firm* — Leong C. Lei

(57) ABSTRACT

An automatic water discharge device is provided for use with a pneumatically operated apparatus and includes a housing including a water accumulation chamber; an electromagnetic valve coupled to the water accumulation chamber and including a bottom air discharge hole; and a detection mechanism arranged in the housing and in operative coupling with the electromagnetic valve. When the detection mechanism detects moisture entraining gas or air passing through the water accumulation chamber, the electromagnetic valve is activated to allow water to drain through the bottom air discharge hole. As such, operations of automatic detection, accurate draining, and effectively blocking impurities can be all performed and an advantage of maintaining the performance of the pneumatically operated apparatus may also be achieved.

7 Claims, 4 Drawing Sheets

(56) References Cited

U.S. PATENT DOCUMENTS

| | | | |
|---|---|---|---|
| 7,182,311 B2 * | 2/2007 | Kimble | F16K 31/0655 251/129.21 |
| 7,524,364 B2 * | 4/2009 | Burke | B60T 17/004 137/559 |
| 9,303,817 B2 * | 4/2016 | Feltgen | F04B 39/16 |

* cited by examiner

AUTOMATIC WATER DISCHARGE DEVICE OF PNEUMATICALLY OPERATED APPARATUS

TECHNICAL FIELD OF THE INVENTION

The present invention relates generally to an automatic water discharge device of a pneumatically operated apparatus, which comprises a detection mechanism, which when detecting moisture entraining gas or air passing through a water accumulation chamber, activates an electromagnetic valve that is set in coupling with the pneumatically operated apparatus to allow water to drain through a bottom air discharge hole so that automatic detection, accurate draining, and effectively blocking impurities can be performed and an advantage of maintaining the performance of the pneumatically operated apparatus may be achieved

DESCRIPTION OF THE PRIOR ART

When put into an operation, a pneumatically operated apparatus, such as an air compressor or pneumatic power based facility, needs to draw in and compress air surrounding the apparatus. Each time when the pneumatically operated apparatus draws in the surrounding air, moisture, dust, or suspending impurities are also drawn in and accumulated in the pneumatically operated apparatus. Consequently, after the pneumatically operated apparatus has been put in operation for a period of time, dirty water and impurities must be removed from the pneumatically operated apparatus in order to prevent the pneumatically operated apparatus from blocking and jamming and thus deteriorating the performance of the pneumatically operated apparatus.

A common way of handling the issue of the pneumatically operated apparatus is to install a water discharge valve in an air accumulation tank of the pneumatically operated apparatus. The water discharge valve is generally manually opened to discharge water at a scheduled or predetermined time. This generally requires human labor and may also result in ineffective discharge of water due to human errors.

SUMMARY OF THE INVENTION

The primary object of the present invention is to overcome the drawbacks of the prior art devices so that when a detection mechanism detects moisture entraining gas or air passing through a water accumulation chamber, an automatic water discharge device that is coupled to a pneumatically operated apparatus may activate an electromagnetic valve thereof to allow the water to be drained or discharged through a bottom air discharge hole. As such, operations of automatic detection, accurate draining, and effectively blocking impurities can be all performed and an advantage of maintaining the performance of the pneumatically operated apparatus may also be achieved.

To achieve the above object, the present invention provides an automatic water discharge device for use with a pneumatically operated apparatus and comprising a housing that comprises a water accumulation chamber; an electromagnetic valve, which is coupled to the water accumulation chamber and comprises a bottom air discharge hole; and a detection mechanism, which is arranged in the housing and in operative coupling with the electromagnetic valve.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
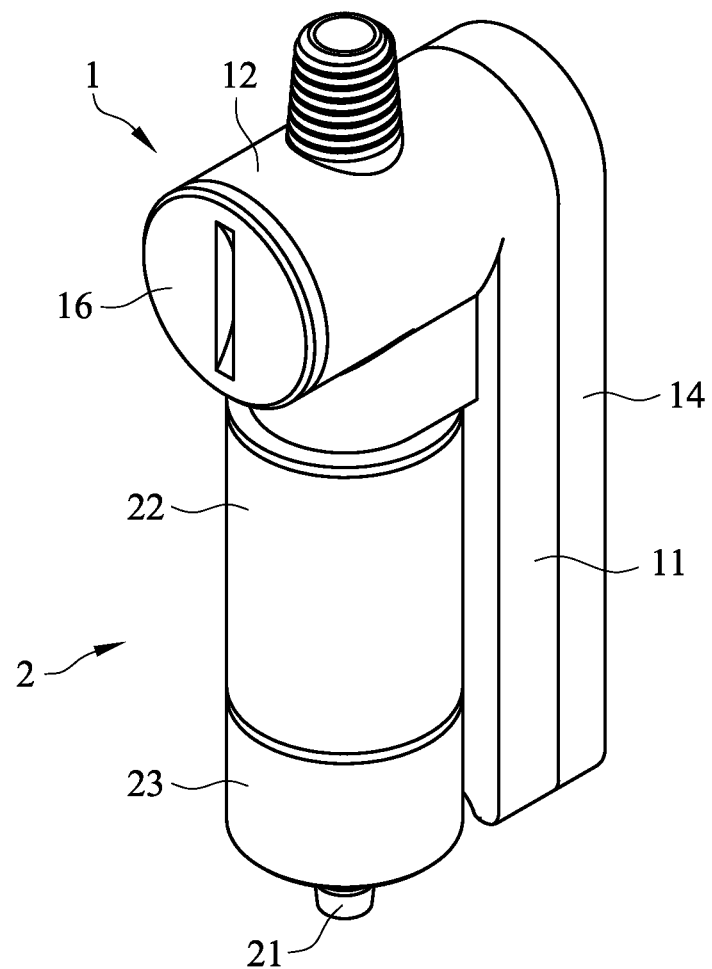
FIG. 1 is a perspective view showing the present invention.
Figure 2:
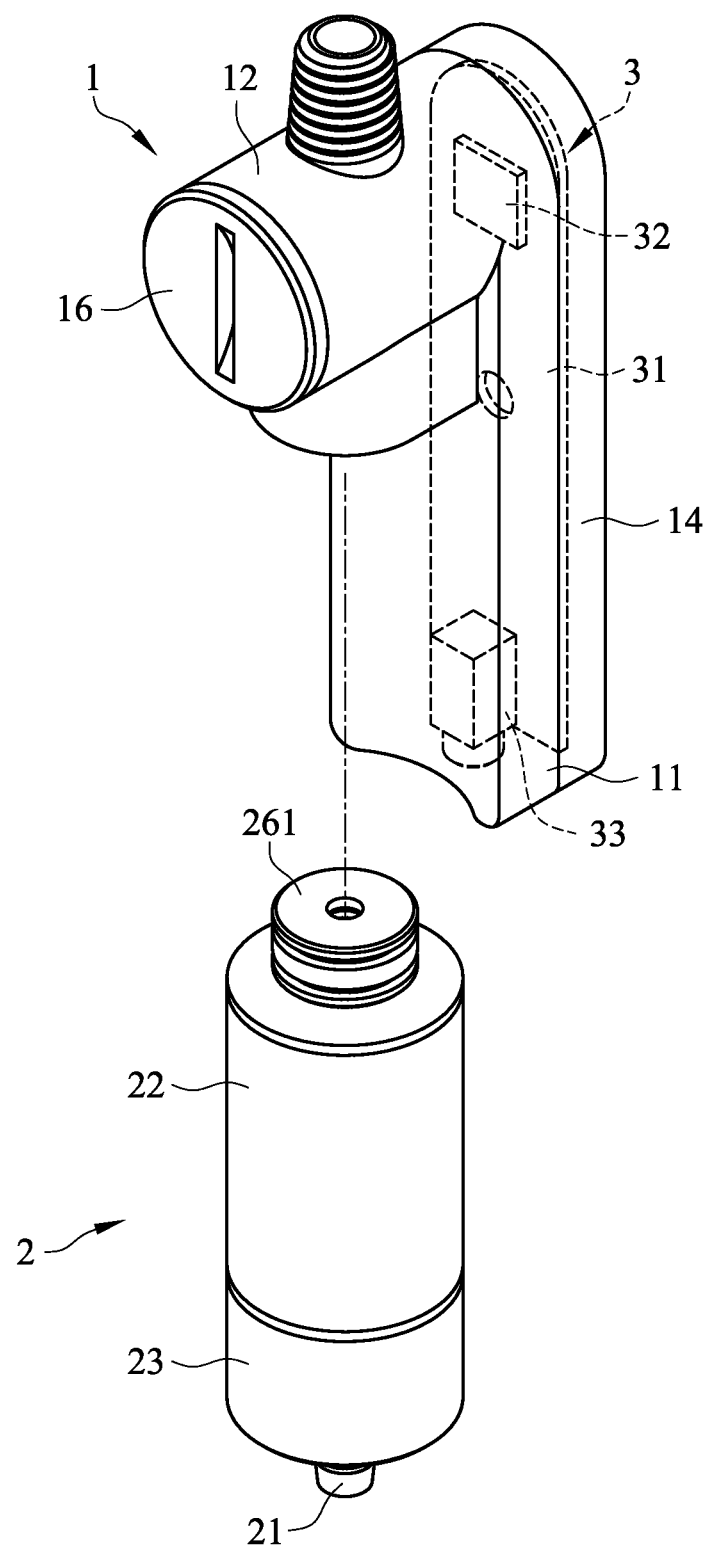
FIG. 2 is a perspective, partly exploded, showing the present invention.
Figure 3:
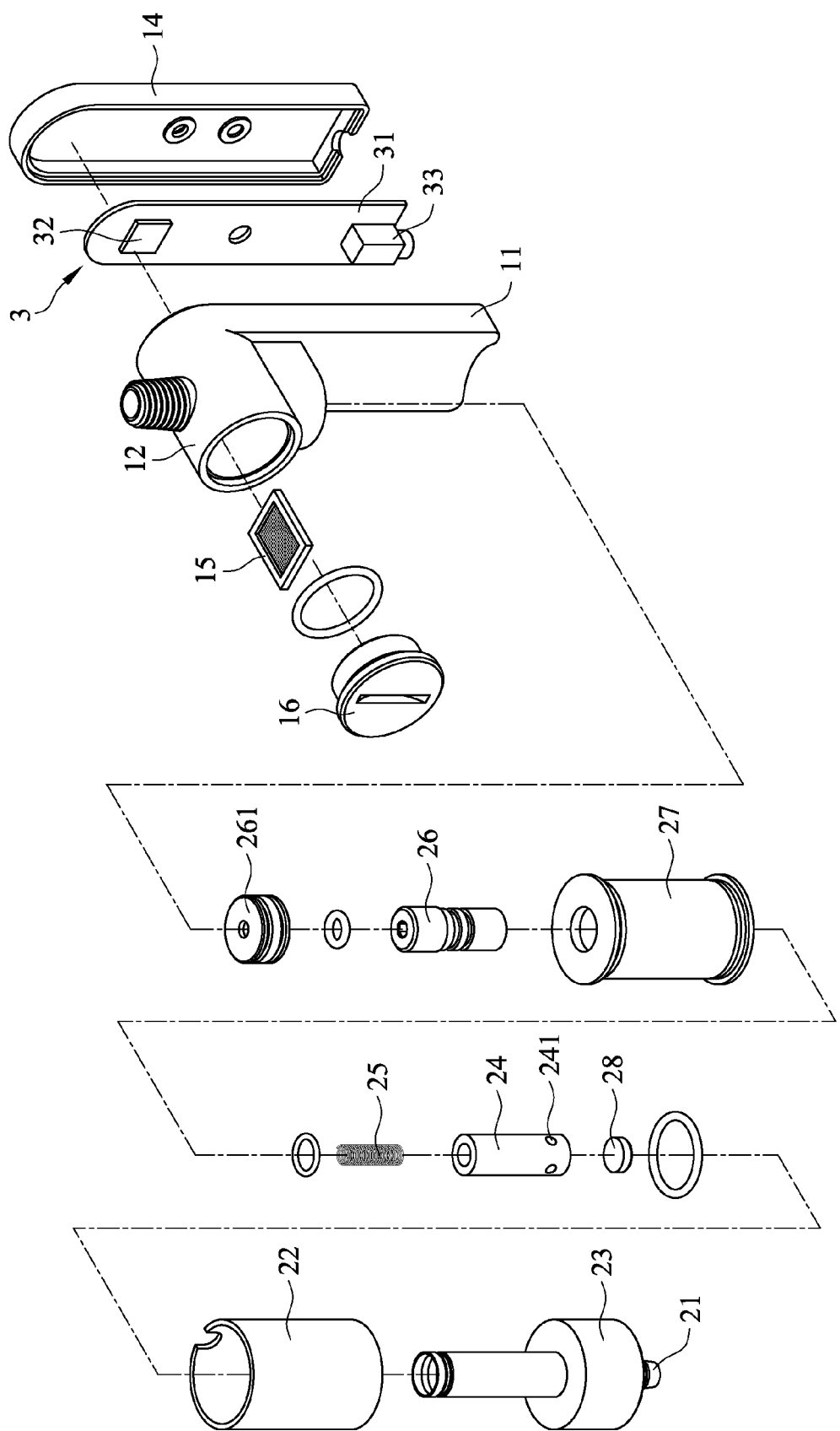
FIG. 3 is an exploded view of the present invention.
Figure 4:
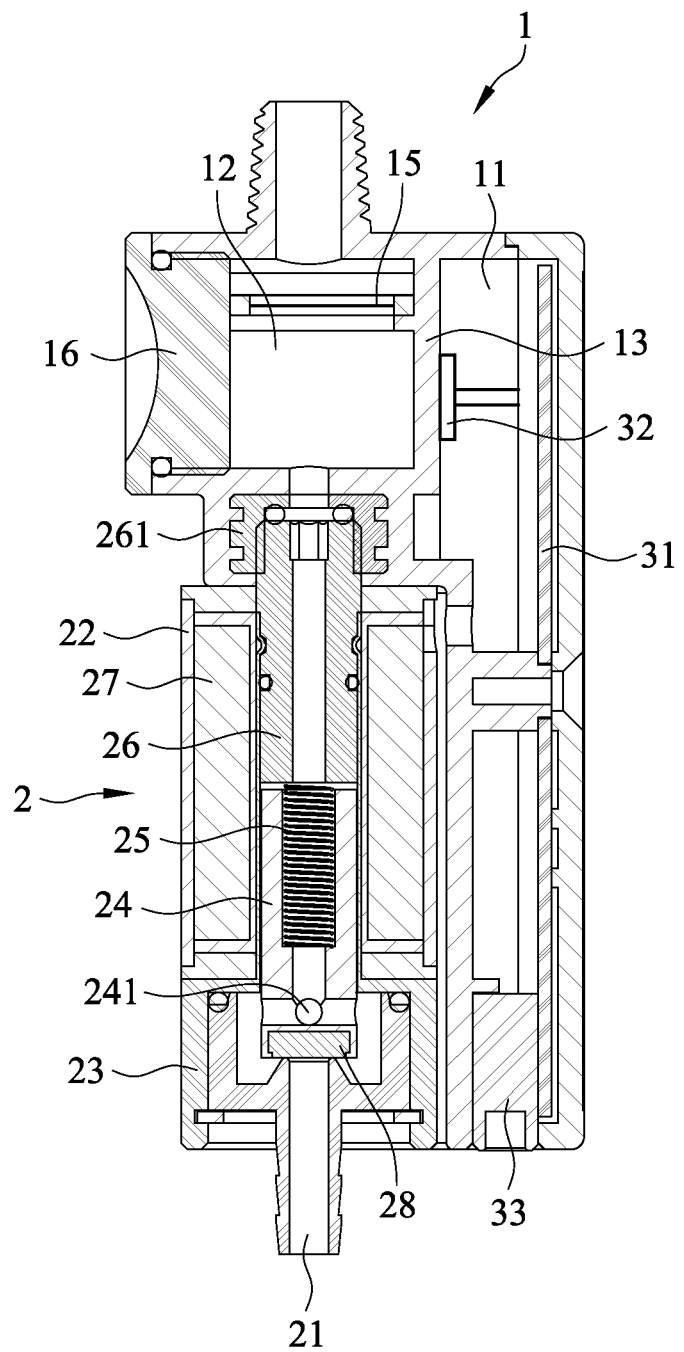
FIG. 4 is a cross-sectional view illustrating the present invention in an operation condition.

Referring to FIGS. 1, 2, 3, and 4, which are respectively a perspective view, a partly exploded perspective view, and an exploded view of the present invention, and a cross-sectional view illustrating the present invention in an operation condition, as shown in the drawings, the present invention provides an automatic water discharge device of a pneumatically operated apparatus, which comprises at least a housing 1, an electromagnetic valve 2, and a detection mechanism 3.

The housing 1 comprises an accommodation unit 11. The accommodation unit 11 has a side on which a water accumulation chamber 12 is formed in such a way that a separation plate 13 is located between the accommodation unit 11 and the water accumulation chamber 12. The accommodation unit 11 has an opposite side to which a printed circuit board (PCB) cover 14 is attached. The water accumulation chamber 12 receives a filtering screen 15 mounted therein in such a way that air or gas is allowed to flow therethrough. The water accumulation chamber 12 has an open end to which a filtering screen cleaning lid 16 is mounted for closure thereby covering the filtering screen 15.

The electromagnetic valve 2 is coupled to the water accumulation chamber 12 of the housing 1. The electromagnetic valve 2 comprises a bottom air discharge hole 21. The electromagnetic valve 2 also comprises a coil casing 22, a coil support 23 arranged at a lower end of the coil casing 22, a movable iron core 24 received in the coil support 23, an elastic element 25 arranged in the movable iron core 24, a magnetic conductor 26 arranged in the coil support 23, and a coil assembly 27 fit outside the coil support 23. The bottom air discharge hole 21 is formed in the coil support 23. The movable iron core 24 has a lower end in which through holes 241 is formed to be in communication with the bottom air discharge hole 21 and a pad or seal 28 is arranged, such as being attached to the iron core to be positionable against a bore of the bottom air discharge hole, to provide openable sealing between the bottom air discharge hole 21 and the through holes 241 of the movable iron core 24. The magnetic conductor 26 is coupled through engagement with a threading coupling section 261 to the water accumulation chamber 12.

The detection mechanism 3 is arranged in the accommodation unit 11 of the housing 1 and is in operative coupling with the electromagnetic valve 2. The detection mechanism 3 is housed and covered by the PCB cover 14 that is arranged at the opposite side of the accommodation unit 11. The detection mechanism 3 comprises a control unit 31 connected to the coil assembly 27 of the electromagnetic valve 2, a sensor unit 32 that is connected to the control unit 31 and is set at a location corresponding to the water accumulation chamber 12, and a power connector 33 that is connected to the control unit 31 and is set at a location corresponding to a bottom of the accommodation unit 11. As such, the structural arrangement described above provides a novel automatic water discharge device of a pneumatically operated apparatus.

To operate, the present invention is connected, for example through threading engagement, to a pneumatically operated apparatus or any necessary device (not shown) and the power connector 33 is connected, perhaps via a transformer (not shown), to an external power supply to receive electrical power necessary for the operation thereof. When the sensor unit 32 of the detection mechanism 3 detects moisture entraining air or gas flowing through the water accumulation chamber 12, the control unit 31 is activated to have the coil assembly 27 of the electromagnetic valve 2 energized so that the coil assembly 27, being so excited, works with the magnetic conductor 26 and causes the movable iron core 24 to move upward and compress the elastic element 25 against the magnetic conductor 26, thereby releasing the pad 28 interposed between the bottom air discharge hole 21 and the movable iron core 24 so as to allow water to flow through the through holes 241 into the bottom air discharge hole 21 to be discharged therefrom. In such an operation, the sensor unit 32 is structured and arranged to perform automatic and precise detection of moisture entraining air or gas so as to allow the moisture or water to be drained after being removed out of the gas or air.

Further, when air or gas that contains moisture enters the water accumulation chamber 12, the filtering screen 15, which may have ultrafine mesh, may first function to remove impurities from the gas or air flowing therethrough, and then draining of water is performed. This helps prevent jamming occurring in discharging water caused by the impurities and also the effectively blocks dirty water and debris in order to maintain the performance of the pneumatically operated apparatus. After a lapse of time of operation of the device, the filtering screen cleaning lid 16 can be removed for cleansing or replacement of the filtering screen 15.

In summary, the present invention provides an automatic water discharge device for use with a pneumatically operated apparatus to achieve improvements that effectively overcome the drawbacks and deficiency of the prior art devices, whereby when the detection mechanism detects moisture entraining gas or air passing through the water accumulation chamber, the automatic water discharge device that is coupled to the pneumatically operated apparatus may activate the electromagnetic valve to allow the water to be drained or discharged through the bottom air discharge hole. As such, operations of automatic detection, accurate draining, and effectively blocking impurities can be all performed and an advantage of maintaining the performance of the pneumatically operated apparatus may also be achieved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. An automatic water discharge device for use with a pneumatically operated apparatus, comprising:
    a housing, which comprises a water accumulation chamber adapted to receive gas containing moisture to flow into the water accumulation chamber;
    an electromagnetic valve, which is coupled to the water accumulation chamber of the housing, the electromagnetic valve comprising a bottom air discharge hole; and
    a detection mechanism, which is arranged in an accommodation unit formed in the housing to detect the moisture contained in the gas flowing into the water accumulation chamber and in operative coupling with the electromagnetic valve;
    wherein a separation plate is arranged between the accommodation unit and the water accumulation chamber so as to shield the detection mechanism that is is arranged in the accommodation unit from exposure to the moisture contained in the gas flowing into the water accumulation chamber.

2. The automatic water discharge device according to claim 1, wherein the water accumulation chamber is formed at one side of the accommodation unit and separated from the accommodation unit by the separation plate.

3. The automatic water discharge device according to claim 2, wherein the accommodation unit has one side to which a PCB cover is attached to house the detection mechanism.

4. The automatic water discharge device according to claim 2, wherein the water accumulation chamber comprises a filtering screen arranged therein and the water accumulation chamber has an end to which a filtering screen cleaning lid is removably mounted to cover the filtering screen.

5. The automatic water discharge device according to claim 1, wherein the electromagnetic valve comprises a coil casing, a coil support arranged at a lower end of the coil casing, a movable iron core received in the coil support, an elastic element arranged in the movable iron core, a magnetic conductor arranged in the coil support, and a coil assembly fit outside the coil support and connected to the detection mechanism, the bottom air discharge hole being formed in the coil support, the movable iron core having a lower end in which a through hole is formed to be in communication with the bottom air discharge hole, a pad being arranged between the bottom air discharge hole and the through hole of the movable iron core.

6. The automatic water discharge device according to claim 5, wherein the magnetic conductor is connected through a threading coupling section to the water accumulation chamber.

7. The automatic water discharge device according to claim 1, wherein the detection mechanism comprises a control unit connected to the electromagnetic valve, a sensor unit connected to the control unit and set at a location corresponding to the water accumulation chamber, and a power connector connected to the control unit and set at a location corresponding to a bottom of the housing.

\* \* \* \* \*